US008928763B2

(12) United States Patent
Kostyukov et al.

(10) Patent No.: US 8,928,763 B2
(45) Date of Patent: Jan. 6, 2015

(54) DETECTING AND CORRECTING BLUR AND DEFOCUSING

(75) Inventors: Mikhail Kostyukov, Moscow (RU); Sergey Fedorov, Moscow (RU)

(73) Assignee: ABBYY Development LLC (RU)

( * ) Notice: Subject to any disclaimer, the term of this patent is extended or adjusted under 35 U.S.C. 154(b) by 222 days.

(21) Appl. No.: 13/305,768

(22) Filed: Nov. 29, 2011

(65) Prior Publication Data

US 2012/0243792 A1 Sep. 27, 2012

Related U.S. Application Data

(63) Continuation-in-part of application No. 12/330,771, filed on Dec. 9, 2008, now Pat. No. 8,098,303.

(51) Int. Cl.
*H04N 5/228* (2006.01)
*G06K 9/40* (2006.01)
*G06T 5/00* (2006.01)

(52) U.S. Cl.
CPC . *G06K 9/40* (2013.01); *G06T 5/003* (2013.01); *G06T 2207/20021* (2013.01); *G06T 2207/20056* (2013.01); *G06F 2207/20201* (2013.01); *G06K 2209/01* (2013.01)
USPC .................................................. 348/208.4

(58) Field of Classification Search
CPC ............ H04N 5/23264; H04N 5/3656; H04N 1/4092; H04N 5/2622; G06T 5/001
USPC .................................................. 348/208.4
See application file for complete search history.

(56) References Cited

U.S. PATENT DOCUMENTS

| | | | |
|---|---|---|---|
| 5,550,935 A | 8/1996 | Erdem et al. | |
| 5,745,597 A | 4/1998 | Agazzi et al. | |
| 5,778,103 A | 7/1998 | Allan et al. | |
| 6,470,097 B1 | 10/2002 | Lai et al. | |
| 6,798,910 B1 | 9/2004 | Wilson | |
| 6,859,564 B2 | 2/2005 | Caron | |
| 7,619,656 B2 | 11/2009 | Ben-Ezra et al. | |
| 7,639,289 B2 | 12/2009 | Agrawal et al. | |
| 8,300,949 B2* | 10/2012 | Xu ................................ | 382/199 |
| 2001/0024534 A1 | 9/2001 | Gregory et al. | |
| 2003/0182246 A1 | 9/2003 | Johnson et al. | |

(Continued)

OTHER PUBLICATIONS

Yitzhaky et al., Direct method for restoration of motion-blurred images, Jan. 7, 1998, J. Opt Soc. Am. A/vol. 15, No. 6/Jun. 1998, pp. 1512-1519.

(Continued)

*Primary Examiner* — James Hannett
(74) *Attorney, Agent, or Firm* — LeighAnn Weiland; Veronica Weinstein

(57) ABSTRACT

Detecting blur and defocusing in images is described. After detection, correction algorithms are applied. Detection provides an image processing system with parameters related to a blur (e.g., direction, strength) and noise levels, or may trigger a message to a user to re-take a photograph. Detection involves finding and analyzing edges of objects instead of an entire image. Disclosed detector may be used for OCR purposes, blur and defocusing detection in photographic and scanning devices, video cameras, print quality control systems, computer vision. Detection of blur and defocusing of an image involve second derivatives of image brightness. Object edges are detected. For points on edges, profiles of second derivative are obtained in the direction of the gradient. Statistics are gathered about parameters of profiles in various directions. By analyzing statistics, image distortions and their type (e.g., blur, defocusing), the strength of distortion, the direction of the blur are detected.

24 Claims, 6 Drawing Sheets

(56) References Cited

U.S. PATENT DOCUMENTS

| | | | |
|---|---|---|---|
| 2006/0066911 A1* | 3/2006 | Miller et al. | 358/3.27 |
| 2007/0286514 A1 | 12/2007 | Brown et al. | |
| 2008/0012955 A1 | 1/2008 | Johnson et al. | |
| 2008/0187219 A1* | 8/2008 | Chen et al. | 382/173 |
| 2009/0245677 A1* | 10/2009 | Nattress | 382/255 |
| 2010/0033618 A1* | 2/2010 | Wong et al. | 348/347 |
| 2013/0177254 A1* | 7/2013 | Nattress | 382/255 |

OTHER PUBLICATIONS

Kundur et al., Blind Image Deconvolution Revisited, IEEE Signal Processing Magazine, Nov. 1996, pp. 61-63.

Kundar et al, Blind Image Deconvolution: An Algorithmic Approach to Practical Image Restoration, University of Toronto, May 1996 issue of IEEE Signal Processing Magazine, pp. 1-42.

* cited by examiner

> The registration fee includes:
> - Admission to the conference s
> - Reception at Haakon's Hall on

FIG. 1A

> The registration fee includes:
> - Admission to the conference s
> - Reception at Haakon's Hall on

FIG. 1B

> The registration fee includes:
> - Admission to the conference s
> - Reception at Haakon's Hall on

FIG. 1C

> The registration fee includes
> - Admission to the conference s
> - Reception at Haakon's Hall on

FIG. 1D

402 The registration fee includes:
• Admission to the conference's
• Reception at Haakon's Hall on

*FIG. 4A*

401 The registration fee includes:
• Admission to the conference's
• Reception at Haakon's Hall on

*FIG. 4B*

DETECTING AND CORRECTING BLUR AND DEFOCUSING

CROSS-REFERENCE TO RELATED APPLICATIONS

For purposes of the USPTO extra-statutory requirements, the present application constitutes a continuation-in-part of U.S. patent application Ser. No. 12/330,771 that was filed on 9 Dec. 2008 now U.S. Pat. No. 8,098,303, which is currently co-pending, or is an application of which a currently co-pending application is entitled to the benefit of the filing date.

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present invention relates to image processing, and particular to a method for detecting and restoring motion-blurred, blurred and defocused images.

BACKGROUND ART

Photographic images may be degraded. Degradation may be caused by many factors, e.g., an image may be blurred by relative motion between the camera and the object of interest or during an image capture process (FIG. 1A), degraded with out-of-focus and noise captured during long exposure times, and affected by scattered light distortion in confocal microscopy. This problem is also common when the imaging system is in moving vehicles or held by human hands.

Increasing numbers of mobile devices are equipped with digital cameras. Photographic images obtained by means of these devices often require additional pre-processing to correct different defects of image registration, such as blur and defocusing.

While there may be several methods for attempting to correct blur, so far, known methods fail to sufficiently identify and correct blur and defocusing.

BRIEF DESCRIPTION OF THE DRAWINGS

FIG. 1A shows a fragment of an example image with blur in its original state.

FIG. 1B shows the fragment shown in FIG. 1A in a restored state after applying a method as described herein for restoring blurred images.

FIG. 1C shows the fragment shown in FIG. 1B after being binarized.

FIG. 1D shows the fragment shown in FIG. 1A after being binarized without applying a method as described herein.

FIG. 4A shows an example Laplacian-like image derived from the fragment shown in FIG. 1A.

FIG. 4B shows object edges for the fragment 1A obtained from the Laplacian-like image shown in FIG. 4A by applying zero-crossing filtering.

DETAILED DESCRIPTION

Figure 2:
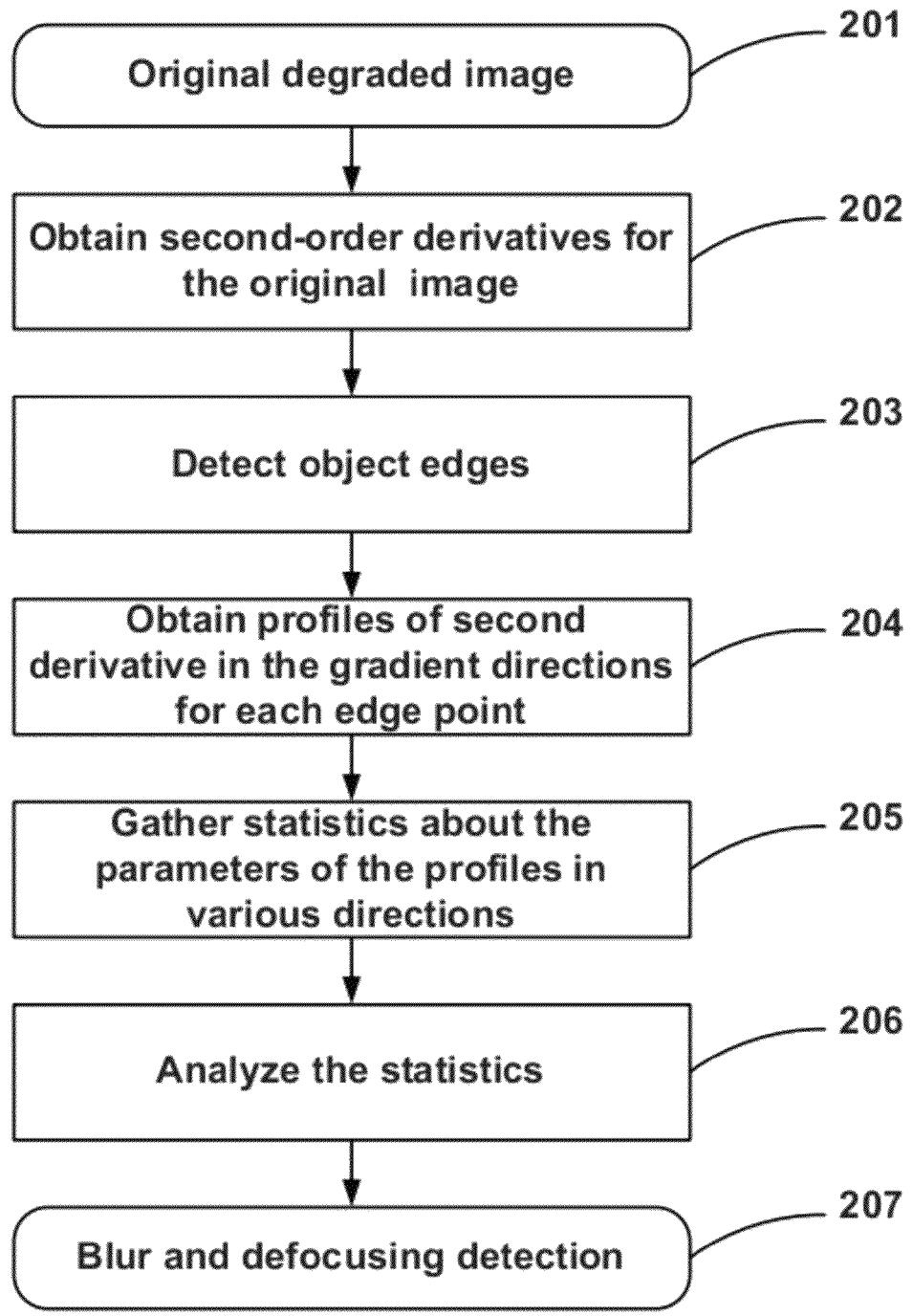
FIG. 2 shows a flowchart of a method for detecting blur and defocusing in accordance with one exemplary embodiment of the invention.

In the following description, for purposes of explanation, numerous specific details are set forth in order to provide an understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrases "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The methods used to restore blurred and/or defocused images typically involve convolving the real or captured image with a point spread function (PSF) such as:

$$g(x, y) = \sum_{k=1}^{K} \sum_{m=1}^{M} f(k, m)h(x-k, y-m) + n(x, y), \quad (1)$$

where
f(x,y) is the non-blurred image;
g(x,y) is the image obtained from the camera;
h(x,y) is the PSF;
n(x,y) is the noise; and
K and M is the size of the image in pixels.

In the case of a blurred image, the PSF is a function of one argument, i.e., $h(x,y)=h_{1D}(x \sin(\alpha)+y \cos(\alpha))$, where $\alpha$ is the angle of the blur.

In the Fourier space, the equation (1) becomes:

$$G(p,q)=F(p,q)H(p,q)+N(p,q), \quad (2)$$

where, for example, $$G(p,q) = \sum_{x=1}^{K}\sum_{y=1}^{M} e^{\frac{2\pi}{K}ipx+\frac{2\pi}{M}iqy} g(x,y) \text{ and}$$

$$g(x,y) = \frac{1}{K \cdot M}\sum_{p=1}^{K}\sum_{q=1}^{M} e^{-\left(\frac{2\pi}{K}ipx+\frac{2\pi}{M}iqy\right)} G(p,q).$$

Since the function G(p,q) and the others are periodical G(p, q)=G(p–K, q)=G(p,q–M), it is assumed everywhere below that the p and q variables may have either positive or negative values.

H(p,q) is the Fourier transform of the PSF, often called optical transfer function (OTF). In the case of a blurred image, the OTF is a complex function of one argument H(p, q)=$H_{1D}$(p·sin(α+π/2)+q·cos(α+π/2)).

Also, the Wiener filter may be used to restore images:

$$\hat{F}(p,q) = \frac{H^*(p,q)}{|H(p,q)|^2 + \frac{|N(p,q)|^2}{|F(p,q)|^2}} G(p,q), \quad (3)$$

where
$\hat{F}$(p,q) is the estimated function (which hopefully is close to F(p,q)) and
H*(p,q) is the complex conjugate of H(p,q).

This filter minimizes the root mean square deviation of the restored image from the real image $$\sum_{x,y}\left(\hat{f}(x,y)-f(x,y)\right)^2,$$

provided that the average noise value is 0.

Therefore, in order to restore a blurred image, one needs to know:
1. the OTF H(p,q), and
the signal-to-noise ratio in the impulse space $$\frac{|N(p,q)|^2}{|F(p,q)|^2}.$$

Successful restoration of blurred images largely depends on the quality of blur detection algorithms and algorithms used to discover parameters of a blur and other defects. A blur detector may be applied to the original image in order to detect blur, the direction and strength of the blur, the level of noise, and other parameters.

A blur detector is particularly useful in mobile devices. Pictures taken with cameras built into mobile devices are typically of low quality. They are often taken in poor lighting conditions, which causes blur, poor focus, and high levels of noise. There is a growing need to use a blur detector for such images, as many mobile devices may be equipped with optical character recognition (OCR) functionality (e.g., for reading and recognizing barcodes, business cards, for performing language translation) or can connect to online OCR services.

Algorithms used to detect blur and defocusing must meet certain requirements such as:
reliable detection of degraded areas;
efficient or high performance;
resistance to high levels of noise (common in mobile devices);
resistance to uneven lighting, very bright lighting and poor lighting; and
resistance to histogram manipulations, such as equalization.

The above requirements make the task of blur detection very difficult to solve. To simplify the task, the class of images on which defects are to be detected is usually narrowed down to include images that contain only certain types of objects. If the type of object to be expected on an image is known in advance, we can identify not only the typical features of the objects themselves, but also the typical features of the blur on these objects. Examples of narrow image classes include images of cells or bacteria, images of textured objects, text images, barcode images, and light and shadow in an image. But even with the class of images narrowed down, the task remains very difficult because of the high-performance and noise resistance requirements.

In the disclosed method for detecting blur and defocusing, a second-order method is used to detect object edges. Common examples of this method involve a LoG filter (the Laplacian of the Gaussian) and a DoG filter (the Difference of Gaussians).

An LoG filter first applies a Gaussian smoothing, then applies the Laplacian filter. A DoG filter is the subtraction of two Gaussian smoothed images obtained by convolving the original image with Gaussian functions having different degrees of smoothing (standard deviation). To set up the filters, the σ parameter (standard deviation) of the Gaussian smoothing $$gs(x,y) = \frac{1}{2\pi\sigma^2} e^{-\frac{x^2+y^2}{2\sigma^2}}$$

is used.

Then zero crossing checking is performed (i.e., when the resulting value goes from negative to positive or vice versa). The result of applying these filters is an image with the edges of the original image.

FIG. 1A shows a fragment of a blurred image in its original state as captured by a device and is referred to simply as the image. For example, the image may have been obtained from a photographic camera and may have been stored in an electronic form. The image is in need of restoration. To restore this image, the method may include the following steps (as shown at least partially in FIG. 3):
Loading or acquiring a blurred image in need of restoration (301);
Finding the absolute value of the one-dimensional optical transfer function (OTF), which is the Fourier transform of PSF (302);
Determining the signal-to-noise ratio in the Fourier space (303);
Determining the phase of the one-dimensional OTF with corresponding accuracy (304);
Selecting the sign of the phase of the one-dimensional OTF (305).

Next, the image can be restored to obtain the image shown in FIG. 1B, which can be successfully, or at least more successfully, processed by an OCR software, firmware or hardware application. Most OCR applications are capable of performing binarization of an image. A binarized restored image (such as the fragment shown in FIG. 1C) is more appropriate for recognition processes in comparison with a binarized original image (such as the fragment shown in FIG. 1D).

The above image restoration method is used when it is known in advance that the image is blurred. To detect and restore blurred and defocused images automatically, a blur and defocusing detector should be applied.

The application of a blur and defocusing detector may, for example, trigger blur and defocusing correction algorithms, provide the image processing system with the parameters of a blur (e.g., its direction or strength) and noise levels, or issue a warning message to the user asking him to take another photo, etc.

In order to detect blur and defocusing, only the edges of the objects may be analyzed instead of the entire image. Broad classes of images will have objects with well-defined edges in all directions. Such defects as blur and defocusing typically result in degradation such as less sharp edges.

Detecting edge distortions has many applications, and the disclosed detector may be used not only for OCR purposes but for many other image processing tasks, such as blur and defocusing detection in photographic and scanning devices, video cameras, print quality control systems, computer vision, etc.

In many images, there will be brightness jumps at the edges of the objects. In the case of undistorted images, these are sharp changes in brightness at the edges of the objects.

After light passes through an optical system and images are registered on a photographic sensor, various distortions of the original image occur, such as uneven lighting, blur, defocusing, and noise. Additional distortions are introduced when the image is post-processed and compressed (e.g., by using a JPEG or other lossy compression that yields JPEG artifacts). The edges of the objects are also affected by all of the above types of distortion. Therefore, instead of a sharp change in brightness at the edges of objects, there is a gradual change in brightness compounded by noise. By analyzing the brightness profile at the edges, presence of one or another distortion may be presumed and strength of image degradation may be identified.

With reference to FIG. 2, in the disclosed method, presumptions about blur and defocusing of the original image (201) are based on the second derivatives of the image brightness (step 202). First, object edges are detected (step 203), and then for points on the edges, profiles of second derivative are obtained in the direction of the gradient (step 204), and statistics are gathered about the parameters of these profiles in various directions (step 205). By analyzing the statistics (step 206), distortions in the image and their type (e.g., blur and defocusing), the strength of distortion, the direction of the blur, etc. are detected (207).

At step 202, in order to obtain the second-order derivatives for the original image (201), any Laplacian filter, or any approximation of a Laplacian filter, may be applied. To reduce the effect of noise, the image should first be smoothed, for which purpose Gaussian smoothing or any other smoothing method may be used, e.g. median filter, box-filter, adaptive median filter, etc. Also, transformations may be used which include both filters, such as LoG (the Laplacian of the Gaussian) filtering and DoG (the Difference of Gaussians) filtering.

A smoothed original image to which a Laplacian filter or its approximation has been applied is hereafter termed Laplacian-like image. An example of Laplacian-like image of the fragment shown in FIG. 1A is represented in FIG. 4A. The type of filter (i.e., the smoothing and approximation methods) and the filtering parameters (e.g., standard deviation of Gaussian smoothing) may be selected so as to take into account typical characteristics of a given class of images or a photographic device to best detect defects on the image.

At step 203, a zero-crossing filter is applied to the Laplacian-like image and is shown in FIG. 4B. As a result of this filtering, one-pixel-thick edges are identified on the image. As a result of this operation, false edges may be identified. False edges usually occur because of high levels of noise. In order to reduce the occurrence of false edges, a zero-crossing threshold is specified. This threshold sets the minimum jump in brightness between the adjacent or close pixels on the Laplacian-like image, when the zero-cross point is assumed to be an edge. The threshold can be computed from the parameters of the performed smoothing and by assessing the levels of noise on the input image (e.g., by assessing the noise dispersion). The threshold may also be selected experimentally. In some cases, information about the noise may be available in advance. For example, some photographic cameras can provide noise assessments based on the camera settings used.

Figure 5A:
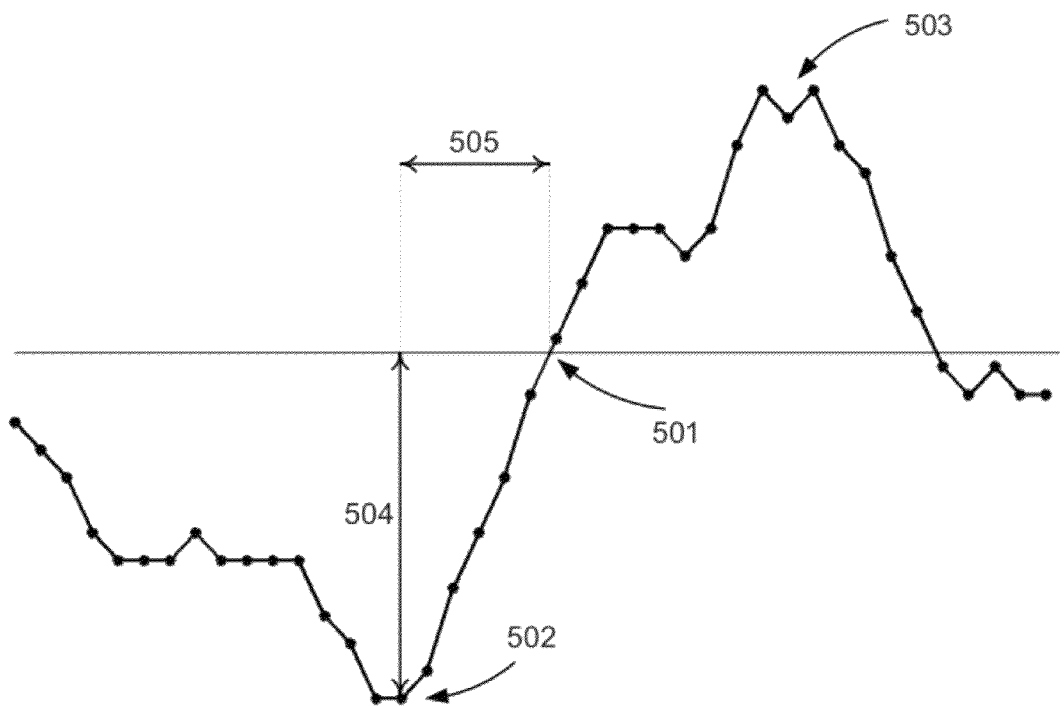
FIG. 5A shows a profile of second derivative in the gradient direction for point 402 of FIG. 4A.

At step 204, for each point on the edges thus obtained (as shown in FIG. 4B), a direction of gradient is found in the corresponding points on the Laplacian-like image (shown in FIG. 4A) and a profile of second derivative in the direction of the gradient is obtained. For example, for point 401 a direction of a gradient for point 402 is horizontal and a profile of second derivative in the horizontal direction (shown in FIG. 5A) is obtained.

Next, local extrema (e.g., points 502 and 503 shown in FIG. 5A) are found for the profiles and information is gathered about absolute values of the extrema and distances from the extrema to the corresponding zero crossing point (termed "extremum offset"). For example, in FIG. 5A the absolute value 504 of extremum 502 and its extremum offset 505 are shown, where point 501 is a zero crossing point. Other parameters of the profile may also be used. At step 205 of FIG. 2, the above information is gathered separately for maximum and minimum extrema and separately for the different directions of the gradient.

In one embodiment, to make the gathering of the statistics (e.g., step 205 in FIG. 2) and further analysis (e.g., step 206 in FIG. 2) simpler, the direction of the gradient may be quantized (e.g., at an angle of 45 degrees) before the profile is created. In this case, the statistics are gathered separately for each of the eight directions that have been specified.

Additionally, for each extremum its reliability may be recorded in order to exclude unreliable extrema from the statistics. A local extremum may be assumed to be unreliable if its position may not be reliably detected, for example, when it is considerably stretched or there are two or more local spikes nearby. A large share of unreliable extrema may be a sign of a considerable strength of image distortion. For example in FIG. 5A, the extremum 503 may be marked as unreliable.

The whole image may be segmented into non-overlapping areas of any shape, and the statistics are gathered within each of the areas. Segmentation into areas makes it possible to take into account possible variations in the direction of the blur and others defects in different areas. The direction of the blur may vary, for example, due to the rotation of the camera at the time of shooting or a part of an image may be out of focus when photographs are taken at close distances. Additionally, connected components of the edges may be selected as areas, each connected component being a separate object or object part. This approach allows detecting blur and defocusing separately for each object on the image, which makes it possible to use the detector, for example, for detecting moving objects against a static background.

The statistics for the profiles of the second derivative are gathered separately for each area (step 205) and are then analyzed (step 206). The following features may be used: mean value, dispersion, asymmetry coefficient, and other features computed for each parameter of the second derivative profile (e.g., the absolute values of the local maxima and minima, maximum and minimum offset, etc.). Other features may include the number of identified extrema, the ratio of unreliable extrema (for which the position of the maximum or minimum could not be reliably detected), and correlations between the offsets and absolute values of the extrema.

Figure 5B:
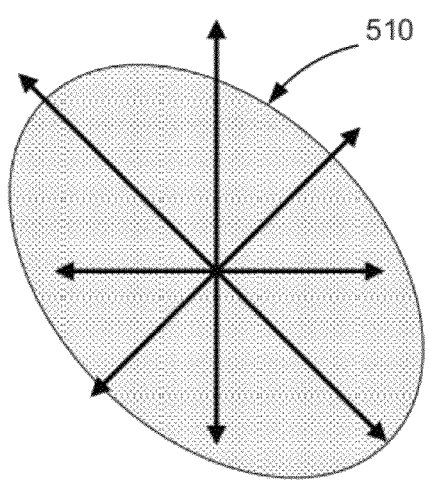
FIG. 5B shows an example of a feature representation as eight vectors (spaced at 45 degrees from each other) and inertia tensor computed for this construct.

As statistics are gathered separately for each specified direction of the gradient, the features (mean value, dispersion, etc.) are also computed separately for each direction. Thus, if eight directions are specified (at multiples of 45 degrees), each feature may be represented as eight vectors (e.g., as shown in FIG. 5B), where the length of each vector corresponds to the value of the feature in its respective direction.

In one embodiment, within step 206, the features thus obtained may be passed to any trained classifier which will use them to identify the type of distortion and its parameters (207). For example, the mean distance from the zero crossing point to the extrema (i.e., the mean value of the extremum offset) for the second derivative gives an estimate of the strength of the blur—the greater the distance or magnitude, the greater the blur.

In another embodiment, within step 206, the set of vectors may be described by a set of features that are invariant to a shift and rotations, for example, by the mean length of the vector, the vectors stretching in a particular direction. These features may include various image moments (e.g., central moments, Hu set of invariant moments, their combinations, etc.). The computed features are subsequently passed to any trained classifier for further analysis. This approach greatly reduces the dimensions of the feature space handled by the classifier and makes the features more immune to lack of statistics in one or more of the specified directions (for example, if there is not enough edges in a particular direction of the gradient).

Example. The set of vectors for each feature may be regarded as a construct made up of material points with certain weights at the ends of the vectors. An inertia tensor may be computed for this construct (e.g., 510), which is a combination of central moments of second order. The weights may be selected, for example, as proportionate to the number of reliable extrema in the direction of the vector, or based on any other criteria. In the general case, the weights may be assumed to be equal 1. Next, the features of the inertia tensor are computed, such as the eccentricity and the trace of the matrix of the tensor, which are subsequently analyzed by a classifier.

The features of the inertia tensor may be used to identify, for example, the following distortion features. The eccentricity may indicate either blur or defocusing, as eccentricity values close to 0 are typical of defocusing. The trace of the inertia tensor provides information about the strength of the blur or defocusing. The direction of the blur coincides with the eigenvector of the inertia tensor with the maximum eigenvalue.

Detecting objects of small widths (e.g., thin lines) is a special problem, especially if such objects have small areas or are obscured by noise. The disclosed detector allows adjusting or changing of the parameters of the filter used to obtain the Laplacian-like image. The parameters of the filter may be selected so as to make the edges of the small-width objects more immune to noise and easier to detect.

The disclosed method is noise resistant, making the detector highly reliable. In the case of high levels of noise or low-contrast edges, additional analysis of area statistics may be performed. Additional analysis may also discover complicated defects, for example, those caused by complicated movements of the photographic camera.

If the detector identifies blur or defocusing, the image may be automatically restored. The image processing systems may receive from the detector information about the strength and direction of the blur and the parameters of the defocusing. Additionally, if noise levels were estimated when identifying the edges of the objects, the noise parameters may also be transferred to the image processing systems.

The disclosed method may be effectively implemented without saving the interim data, making it possible to use the algorithm on devices with limited memory capacity and limited processing power, such as scanners, mobile devices, photographic cameras, etc. In certain embodiments, results from certain steps, partial steps or intermediate steps may be stored or transformed so as to facilitate processing by computer (e.g., software, firmware and hardware) elements.

Figure 3:
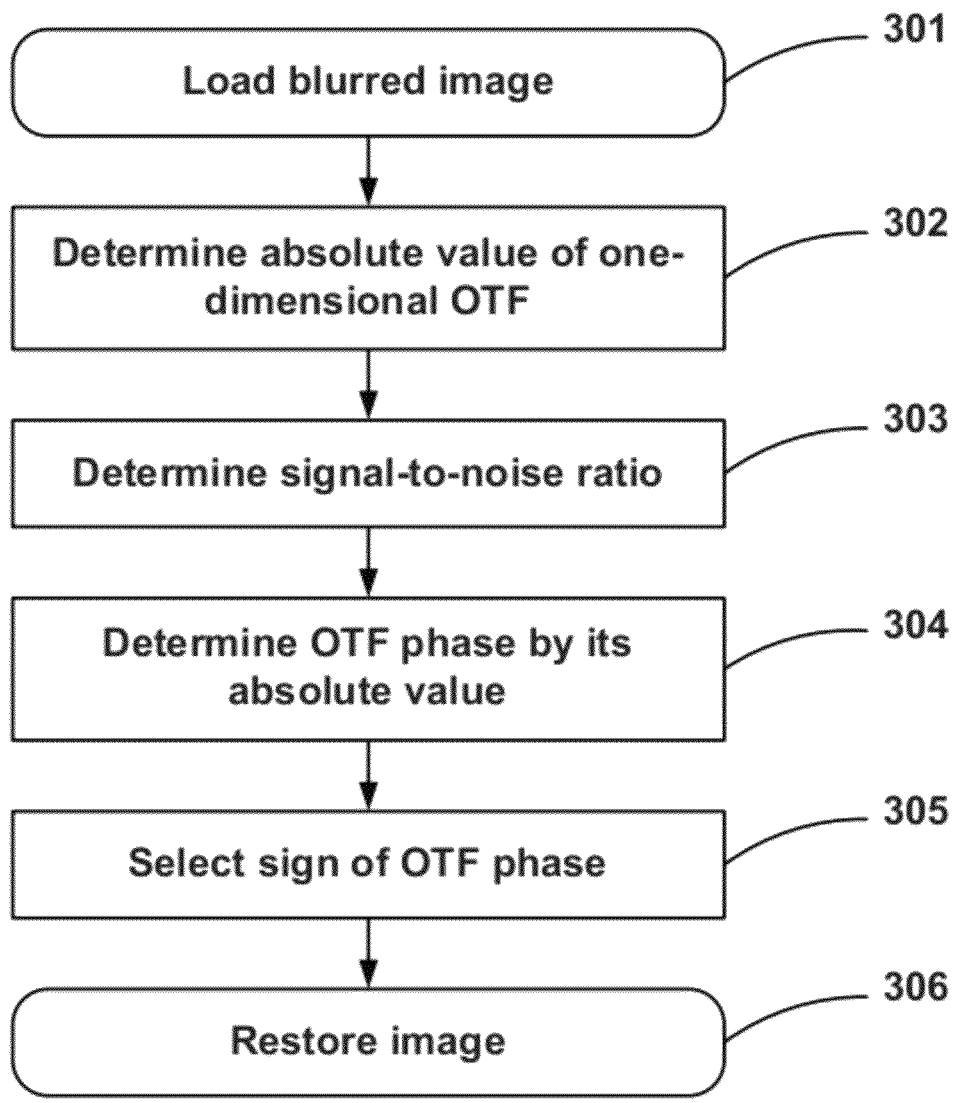
FIG. 3 shows a flowchart of a method for restoring blurred images in accordance with one embodiment of the invention.

A blurred or defocused image may be restored by applying the steps shown in the exemplary implementation of the method as shown in FIG. 3. To determine the OTF (302) and to determine the signal-to-noise ratio (303), other operations may be performed. These steps are described below.

Segmenting the Image Into Windows

If the image were not distorted by additive noise n(x,y), then, in accordance with equation (2), calculating the Fourier transform of the source image (function G(p,q)) would find the zeros of the OTF (function H(p,q)), and, if some additional assumptions are made, the absolute value of the function H(p,q). However, in reality, noise is an important factor which makes determining H(p,q) based on G(p,q) impossible. In different areas of the image, the function H(p,q) may be different (e.g. the direction of the blur may be different due to camera rotation at the moment of taking the picture).

To minimize the impact of the noise, the image is divided or segmented into windows, which are square areas of fixed dimensions. A window must be sufficiently large to include individual elements of the source image in their entirety and sufficiently small to allow segmentation of the image into a considerable number of windows.

The image is segmented into windows in such a manner that the windows overlap at the edges. In each window, the components of each pixel are multiplied by the function of the window, which equals 1 in the middle of the window and gradually decrements to 0 towards its edges.

Segmenting the Image Into Blocks and Calculating the Mean Square of the Modulus of the Fourier Transform The windows are merged into blocks, the size of each block being approximately 5×5 windows. To determine the blur parameters, the function $\Phi_k(p,q)$ is defined, which is the square of the modulus of the Fourier transform, averaged over the windows and belonging to the kth block:

$$\Phi_k(p, q) = \sum_{i=1}^{A} |G_i(p, q)|^2,$$

where A is the number of windows in the kth block.

Provided the average noise value in all the windows is 0, $$\Phi_k(p, q) = |H(p, q)|^2 \sum_{i=1}^{A} |F_i(p, q)|^2 + \sum_{i=1}^{A} |N_i(p, q)|^2.$$

Considering that $$\overline{F}^2(p, q) = \sum_{i=1}^{A} |F_i(p, q)|^2 \text{ and } \overline{N}^2(p, q) = \sum_{i=1}^{A} |N_i(p, q)|^2,$$

the equation may be rewritten as $$\Phi_k(p,q) = |H(p,q)|^2 \overline{F}^2(p,q) + \overline{N}^2(p,q).$$

This averaging significantly reduces the role of the noise and allows extracting information about $|H(p,q)|^2$.

Segmenting the image into blocks, rather than summing up square of the modulus of the Fourier transform $|G_i(p,q)|^2$ over all the image windows, is performed under image restoring in order to take into account the possible differences in the direction of the blur in different image areas. Once the direction of the blur is determined in each block, the functions $\Phi_k(p, q)$ are averaged over blocks, taking into account the directions of the blur in the block:

$$\Phi(p, q) = \sum_k \Phi_k^{(rotated)}(p, q).$$

Deducting the Noise

To restore an image, more precise noise assessments may be necessary than when detecting blur. Generally, one can identify and deduct the noise $\overline{N}(p,q)$ on the function $\Phi_k(p,q)$. Noise may be successfully modeled as a sum of the Gaussian and white noises:

$$\overline{N}^2(p,q) = N_g^2 e^{-(p^2+q^2)/p_0^2} + N_W^2. \quad (4)$$

To find the parameters of the noise, the radial profile of the function $\ln(\Phi_k(p,q))$ is created, i.e. for each absolute value of the impulse $\sqrt{p^2+q^2}$, the minimum value $\ln(\Phi_k(p,q))$ is found. This profile is approximated by the logarithm of type (4).

If the parameters of the noise are successfully found, the noise is deducted as follows:

$$\ln[\Phi_k^{(noiseless)}(p, q)] = \quad (5)$$

$$\ln[\Phi_k(p, q)] - \ln[\overline{N}^2(p, q)] = \ln\left[1 + |H(p, q)|^2 \frac{\overline{F}^2(p, q)}{\overline{N}^2(p, q)}\right]$$

Determining the Direction of the Blur

The direction of the blur may be received from the results of the detector work or it may be determined based on the function $\Phi_k^{(noiseless)}(p,q)$. For this purpose, the function $\ln[\Phi_k^{(noiseless)}(p,q)]$ is projected on the diameter of the circle in different directions. For each direction, the width of the projection is calculated. The direction of the blur is determined by selecting the direction with the minimum ratio of the projection width to the width of the perpendicular projection. The direction is deemed to be reliably determined if the ratio of the widths is greater than a certain threshold, for example, a threshold of 1.5.

Finding the Absolute Value of the One-Dimensional OTF (302)

Once the direction of the blur is determined in each block and the absolute OTF value has been averaged over the blocks, the absolute value of the one-dimensional OTF is determined. This is done similarly to (5) for the block-averaged function:

$$\ln[\Phi^{(noiseless)}(p, q)] = \ln\left[1 + |H(p, q)|^2 \frac{\overline{F}^2(p, q)}{\overline{N}^2(p, q)}\right] \quad (6)$$

Then, along the line that goes through zero (p=0, q=0) in the determined direction, the function H(p,q) is constant and is 1, because PSF is normalized. Since on low frequencies the signal-to-noise ratio is significantly above 1, the section $\ln(\Phi^{noiseless}(p,q))$ that goes through zero in the direction of the blur will be close to $$\ln\left[\frac{\overline{F}^2(p, q)}{\overline{N}^2(p, q)}\right].$$

The signal-to-noise ratio can be successfully modeled by a Gauss function, and the logarithm can be modeled by a parabola. Therefore, at the first step, the section of the function $\ln(\Phi^{noiseless}(p,q))$ is created which goes along the direction of the blur. The section goes through zero and is approximated by a parabola.

Next, it is assumed that the signal-to-noise value is determined only by the absolute value of the impulse $\sqrt{p^2+q^2}$. The one-dimensional OTF $H_{1D}$ can be restored inside the circle enclosed by the condition that requires that the parabola go through zero, i.e. inside the circle in which the signal-to-noise ratio is close to or greater than 1. In this circle, the sections in the direction of the blur are created, which are located at different distances from zero and approximated by the function $$\ln\left(1 + H_{1D}^2 \frac{\overline{F}^2(p, q)}{\overline{N}^2(p, q)}\right), \text{ where } \frac{\overline{F}^2(p, q)}{\overline{N}^2(p, q)}$$

is determined by the found parabola, and $H_{1D}^2$ is an approximation parameter. Thus, $H_{1D}^2$ is determined for each distance from zero. Outside the circle, the OTF decrements gradually to a certain minimal value.

Determining the Signal-To-Noise Ratio (303)

It is assumed that the signal-to-noise ratio $$\frac{\overline{F}^2(p, q)}{\overline{N}^2(p, q)}$$

depends only on the absolute value of the impulse $\sqrt{p^2+q^2}$. For low frequencies, the logarithm $$\ln\left[\frac{\overline{F}^2(p,q)}{\overline{N}^2(p,q)}\right]$$

of the signal-to-noise ratio is determined by the parabola that approximates the section of the function $\ln(\Phi^{(noiseless)}(p,q))$, which goes through zero in the direction of the blur. For higher frequencies, smoothed values of the same section are used. Additionally, a lower limit is introduced: the signal-to-noise ratio must be greater than 0.5.

Determining the Phase of the One-Dimensional OTF Based on its Absolute Value (304)

OTF is a complex function defined by an absolute value and phase. (302) describes how the absolute value of the OTF is determined. The phase has to be determined separately. In a certain class of functions, namely minimum-phase functions, the absolute value $\rho_w$ and the phase $\phi_w$ of their Fourier transform are linked by the Hilbert transform:

$$\varphi_w = \frac{2}{N}\sum_{w'=0}^{N-1}\ln(\rho_{w'}) \times \begin{cases} 0, & \text{if } (w-w') \text{ is even} \\ ctg\left((w-w')\frac{\pi}{N}\right), & \text{if } (w-w') \text{ is odd} \end{cases} \quad (7)$$

Here $w, w'=0 \ldots N-1$. The minimum phase condition is a condition that requires that the function be invertible and that the function and the inverse function be causal functions. The phase of the one-dimensional OTF is determined by (7).

Selecting the Sign of the OTF Phase (305)

The phase of the OTF is determined based on the absolute value of the OTF using the formula (7), with a corresponding accuracy. In order to select the correct sign of the phase, both signs are used to restore the image in several windows which have the maximum gradient. Then the sign that produces the best result is selected. The best result is the one that has the smallest area of the restored segment filled with pixels with a high absolute value of the derivative in the direction of the blur, which means sharper boundaries on the image.

Restoring the Image (306)

In order to restore the image, the Wiener filter (3) is applied to each window. The blur direction of the image is defined on the basis of the function $\Phi_k(p,q)$ to which it belongs. The pixels of the restored image are obtained by averaging over the pixels of the overlapping windows. The value of the window's function is used as the weight.

Figure 6:
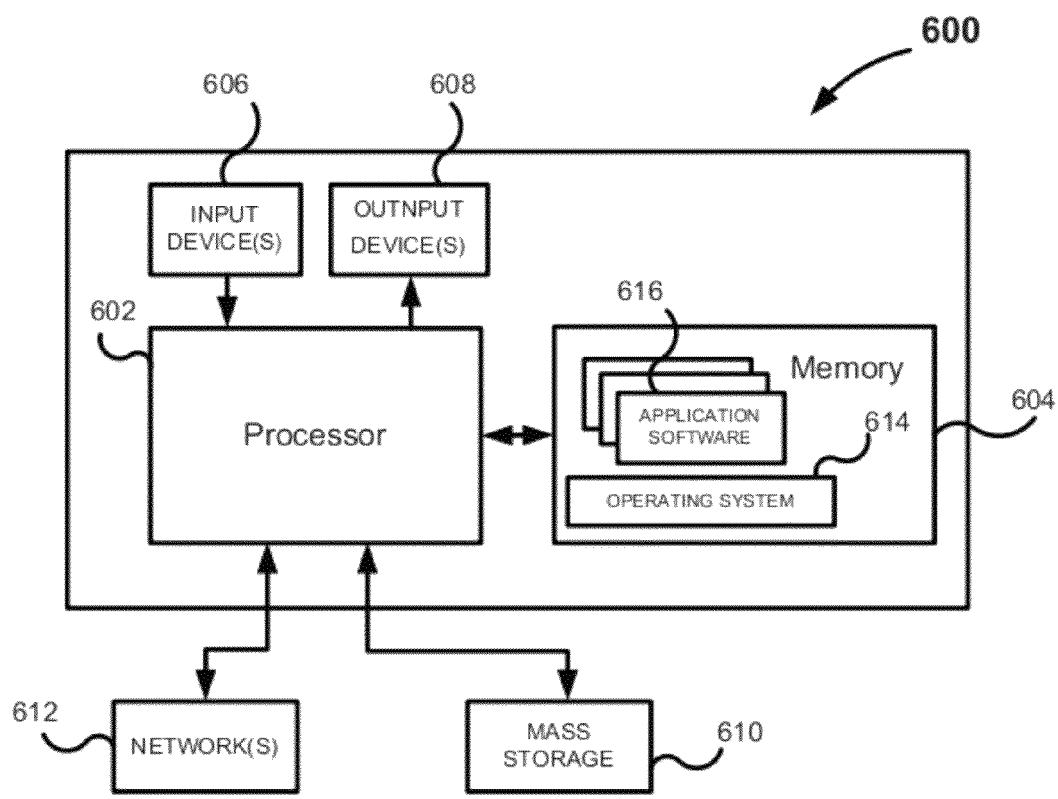
FIG. 6 shows a block diagram of a system for detecting and restoring degraded images in accordance with an example embodiment.

FIG. 6 of the drawings shows an example of a system 600. Depending on the use of the system 600, it may be a system for detecting and restoring a blurred or defocused image, optionally including OCR capabilities. The system 600 may be operable to implement the method of FIG. 2 and/or FIG. 3. The system 600 may include at least one processor 602 coupled to a memory 604. The processor 602 may represent one or more processors (e.g., microprocessors), and the memory 604 may represent random access memory (RAM) devices comprising a main storage of the system 600, as well as any supplemental levels of memory e.g., cache memories, non-volatile or back-up memories (e.g. programmable or flash memories), read-only memories, etc. In addition, the memory 604 may be considered to include memory storage physically located elsewhere in the system 600, e.g. any cache memory in the processor 602 as well as any storage capacity used as a virtual memory, e.g., as stored on a mass storage device 610.

The system 600 also typically receives a number of inputs and outputs for communicating information externally. For interface with a user or operator, the system 600 may include one or more user input devices 606 (e.g., a keyboard, a mouse, imaging device, etc.) and one or more output devices 608 (e.g., a Liquid Crystal Display (LCD) panel, a sound playback device (speaker, etc)).

For additional storage, the system 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 600 may include an interface with one or more networks 612 (e.g., a local area network (LAN), a wide area network (WAN), a wireless network, and/or the Internet among others) to permit the communication of information with other computers coupled to the networks. It should be appreciated that the system 600 typically includes suitable analog and/or digital interfaces between the processor 602 and each of the components 604, 606, 608, and 612 as is well known in the art.

The system 600 operates under the control of an operating system 614, and executes various computer software applications, components, programs, objects, modules, etc. to implement the techniques described above. Moreover, various applications, components, programs, objects, etc., collectively indicated by reference 616 in FIG. 6, may also execute on one or more processors in another computer coupled to the system 600 via a network 612, e.g. in a distributed computing environment, whereby the processing required to implement the functions of a computer program may be allocated to multiple computers over a network. The application software 616 may include a set of instructions which, when executed by the processor 602, causes the system 600 to implement the method of FIG. 2 and/or FIG. 3.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.

Although the present invention has been described with reference to specific example embodiments, it will be evident that various modifications and changes can be made to these embodiments without departing from the broader spirit of the invention. Accordingly, the specification and drawings are to be regarded in an illustrative sense rather than in a restrictive sense.

We claim:

1. A method for detecting degradation in an electronic image, the method comprising:

calculating by a processor a plurality of second-order derivatives for the electronic image;

detecting one or more object edges in the electronic image, wherein the one or more object edges comprise a plurality of edge points;

calculating profiles of second-order derivative for each of one or more gradient directions for the plurality of edge points;

calculating one or more statistics about one or more parameters of each of said profiles, wherein the one or more statistics are at least in part based on the calculated profiles of second-order derivative; and based at least in part on said one or more statistics about the one or more parameters, making a determination whether blur or defocus is present in the electronic image.

2. The method of claim 1, wherein the method further comprises detecting a blur direction based in part on said one or more statistics about said one or more parameters.

3. The method of claim 1, wherein the method further comprises:
prior to said calculating the plurality of second-order derivatives for the electronic image:
obtaining the electronic image;
applying a smoothing function to the electronic image, and
applying a Laplacian filter or an approximation of a Laplacian filter to the elecrtronic image.

4. The method of claim 3, wherein the method further comprises:
adjusting at least one parameter associated with the Laplacian filter or at least one parameter associated with the approximation of the Laplacian filter.

5. The method of claim 1, wherein the detecting one or more object edges in the electronic image comprises applying a zero-crossing filter.

6. The method of claim 1, wherein the method further comprises:
quantizing a direction of a gradient prior to calculating said profiles of second-order derivative;
finding at least one local extremum for the profiles;
obtaining information about absolute value of said at least one local extremum; and
obtaining a distance from said at least one local extremum to a corresponding zero-crossing point.

7. The method of claim 1, wherein the plurality of edge points is a set of detected edge points in the electronic image corresponding to a majority of available edge points.

8. The method of claim 1, wherein the method further comprises initiating a blur correction algorithm or a defocusing correction algorithm based at least in part on said determination whether blur or defocus is present.

9. The method of claim 1, wherein the method further comprises:
determining a measurement for strength of image degradation based at least in part on said statistics about the one or more parameters of one or more profiles.

10. The method of claim 9, wherein the method further comprises:
causing display of a message, wherein the message requests an attempt at capturing an unprocessed electronic image.

11. The method of claim 1, wherein the method further comprises:
calculating a value related to a degradation type, a blur direction, a blur strength, a defocusing strength, or a noise level.

12. The method of claim 11, wherein calculating a value related to said blur strength or a value related to said defocusing strength occurs by calculating a value related to a mean distance from a zero-crossing point in reference to a value related to one or more extrema for a corresponding profile of second-order derivative.

13. The method of claim 1, wherein the method further comprises:
applying a correction algorithm for applying a restoration to the electronic image,
wherein the correction algorithm is based at least in part on said one or more statistics about the one or more parameters of the one or more profiles.

14. The method of claim 1, wherein the method further comprises:
segmenting the electronic image into non-overlapping areas of any shape; and
calculating said one or more statistics about the one or more parameters of each of said profiles within each of the non-overlapping areas of any shape.

15. The method of claim 14, wherein the method further comprises:
calculating a value related to a degradation type, a blur direction, a blur strength, a defocusing strength, or a noise level for each of the non-overlapping areas.

16. The method of claim 1, wherein the one or more statistics comprise a determination of at least one of: a mean value, a dispersion value, an asymmetry coefficient, an absolute value of a local maxima, an absolute value of a local minima, a maximum offset, a minimum offset, a number of identified extrema, a ratio of unreliable extrema, and a correlation between offsets and an absolute value of an extrema.

17. The method of claim 1, wherein the calculating one or more statistics about said one or more parameters of each of said profiles further comprises calculating a value and generating a set of features for classifying a degradation in the electronic image.

18. A device comprising:
a processor;
a memory configured with instructions for detecting degradation in an electronic image, the instructions comprising:
obtaining a copy of the electronic image;
calculating by a processor a plurality of second-order derivatives for the electronic image;
detecting one or more object edges in the electronic image, wherein the one or more object edges comprise a plurality of edge points;
calculating profiles of second-order derivative for each of one or more gradient directions for the plurality of edge points;
calculating one or more statistics about one or more parameters of each of said profiles, wherein the one or more statistics are at least in part based on the calculated profiles of second-order derivative; and
based at least in part on said statistics about the one or more parameters, making a determination whether blur or defocus is present in the electronic image.

19. The device of claim 18, wherein the instructions further comprise detecting a blur direction based in part on said statistics about said one or more parameters.

20. The device of claim 18, wherein the instructions further comprise:
prior to said calculating the plurality of second-order derivatives for the electronic image:
applying a smoothing function to the electronic image, and applying a Laplacian filter or an approximation of a Laplacian filter to the elecrtronic image.

21. The device of claim 20, wherein the instructions further comprise:
adjusting at least one parameter associated with the Laplacian filter or at least one parameter associated with the approximation of the Laplacian filter.

22. One or more physical non-transitory computer-readable media configured with instructions for attempting to detect degradation in an electronic image, the instructions comprising:
calculating by a processor a plurality of second-order derivatives for the electronic image;
detecting one or more object edges in the electronic image, wherein the one or more object edges comprise a plurality of edge points;
calculating profiles of second-order derivative for each of one or more gradient directions for the plurality of edge points;
calculating one or more statistics about one or more parameters of each of said profiles, wherein the one or more statistics are at least in part based on the calculated profiles of second-order derivative; and
based at least in part on said one or more statistics about the one or more parameters, making a determination whether blur or defocus is present in the electronic image.

23. The one or more physical non-transitory computer-readable media of claim 22, wherein the instructions further comprise detecting a blur direction based in part on said one or more statistics about said one or more parameters.

24. The one or more physical non-transitory computer-readable media of claim 22, wherein the instructions further comprise:
prior to said calculating the plurality of second-order derivatives for the electronic image:
applying a smoothing function to the electronic image, and
applying a Laplacian filter or an approximation of a Laplacian filter to the elecrtronic image.

* * * * *